United States Patent Office 3,005,826
Patented Oct. 24, 1961

3,005,826
ORGANIC NITROGEN COMPOUND SEPARATION BY SELECTIVE ADSORPTION
Raymond N. Fleck, Whittier, and Carlyle G. Wight, Fullerton, Calif., assignors to Union Oil Company of California, Los Angeles, Calif., a corporation of California
No Drawing. Filed Nov. 17, 1958, Ser. No. 774,146
10 Claims. (Cl. 260—290)

This invention relates to the separation of organic nitrogen compounds, and in particular concerns an improved adsorptive process for the separation of basic organic nitrogen compounds from mixtures comprising the same and non-basic organic nitrogen compounds.

The present invention is based on our discovery that a silica gel adsorbent is selective with respect to basic organic nitrogen compounds. More particularly we have found that basic organic nitrogen compounds can be separated from a mixture comprising the same and non-basic organic nitrogen compounds by a process which comprises contacting the mixture in either liquid or vapor phase with a silica gel adsorbent to obtain a rich adsorbent containing the basic organic nitrogen components of the feed mixture and an unadsorbed phase enriched in the non-basic organic nitrogen components; separating the rich adsorbent from the non-adsorbed phase; treating the rich adsorbent to desorb the basic organic nitrogen components therefrom; and returning the adsorbent to a lean state for reuse in the next succeeding cycle of operation.

We are aware that it has been proposed to remove normally incident organic nitrogen contaminants from petroleum hydrocarbons streams by selective adsorption. However, in such streams the organic nitrogen compounds occur in minor amounts, and this fact, together with the fact that such separation is always carried out so as to remove all organic nitrogen compounds regardless of their basicity, has obscured the fact that under certain conditions silica gel is capable of separating the basic from the non-basic organic nitrogen compounds.

Considering now the process of the invention in detail it is generally applicable to nitrogenous organic mixtures comprising basic organic nitrogen compounds, e.g., heterocyclic nitrogen bases, amines and the like, and non-basic organic nitrogen compounds, e.g., nitriles, nitrates, nitro compounds, etc. The process is particularly applicable to the organic nitrogen streams derived from the denitrogenation treatment of petroleum stocks, but these nitrogenous mixtures may also be derived from oil shale, tar sand, coke oven distillates, bone oils and other natural, as well as synthetic, sources. Usually such streams will contain from 0 to about 50 percent hydrocarbons, but the presence of such hydrocarbons in such amounts in no way affects the selectivity of the silica gel adsorbent. Of the total amount of the organic nitrogen compounds in the feed stream, the basic compounds may represent from about 5 to about 95 percent and the non-basic compounds may represent from about 95 to about 5 percent. A particularly prefered nitrogenous feed mixture is that derived in the adsorptive separation of organic nitrogen compounds from petroleum stocks as described in our copending applications Ser. No. 624,238, filed Nov. 26, 1956; Ser. No. 621,674, filed Nov. 13, 1956 and Ser. No. 624,387, filed Nov. 26, 1956. These applications have issued as Patent Nos. 2,925,380, 2,925,379, and 2,925,375 respectively.

The silica gel adsorbent employed in accordance with the invention is conventionally prepared by the coagulation of a colloidal solution of silicic acid. The term "gel" merely indicates the condition of the material at one stage of its manufacture. Silica gel is available as a common article of commerce and, as typically used, is a hard glassy substance, similar in appearance to clear quartz sand. It has a highly porous structure characterized by uniformity of structure.

The optimum particle size of the silica gel adsorbent will depend upon the manner in which it is used in the process, that is, as a fixed compact bed, a fluidized bed, etc., but is usually between about 2 and about 400 mesh, preferably between about 4 and about 30 mesh for fixed and moving compact beds and between about 100 and about 300 mesh for fluidized beds.

The silica gel adsorbent is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably, a set of two or more static beds is employed in fixed bed contacting, with appropriate valving so that the feed stream is passed through one or more absorbent beds while the desorption is carried out in one or more of the other beds in the set. The direction of flow during adsorption and desorption may be either up or down through the silica gel, but preferably the adsorption is carried out in one flow direction and the desorption in the other. Any of the conventional apparatus employed in static bed fluid-solids contacting may be used. A moving compact bed of adsorbent has a greater separation efficiency than a fixed compact bed of the same size because of the ability of the former to provide reflux. The moving compact bed is therefore preferable when a high degree of separation is desired or when the feed mixture separation factor is poor.

As previously stated, the feed mixture is contacted with the silica gel in either the vapor or liquid phase. The pressure is usually near atmospheric, but may be either subatmospheric or superatmospheric. In general, the adsorption is carried out at a temperature between about 0° F. and about 800° F., preferably between about 100° F. and 700° F., and at pressures between about atmospheric and about 1,000 p.s.i.g., preferably about 0 p.s.i.g. and about 100 p.s.i.g.

The immediate products of the initial adsorption step are an unadsorbed or raffinate phase is rich in the non-basic organic nitrogen components of the feed mixture and lean in the basic organic nitrogen components, and a solid rich silica gel containing an adsorbate rich in the basic organic nitrogen components of the feed mixture and lean in the non-basic organic nitrogen components. The solid silica gel and the unadsorbed phase are separated, and the latter is passed to storage as the non-basic organic nitrogen product of the process. The rich adsorbent, on the other hand, is treated to desorb the basic organic nitrogen compounds therefrom and to return the absorbent to a lean state for reuse. According to one mode of operation, such treatment comprises subjecting the rich adsorbent to an elevated temperature and/or a reduced pressure. The use of elevated temperatures and/or reduced pressures may also be combined with the use of a stripping gas in the known manner.

In accordance with the preferred mode of operation, the rich silica gel adsorbent is treated with a suitable displacement exchange fluid at approximately the same temperature as that employed in the initial adsorption stage. The displacement exchange fluid may be any material which is inert with respect to silica gel and the feed mixture, which is adsorbable by silica gel, and which is readily separated from the components of the feed mixture by distillation, absorption, or other conventional means. Preferably the displacement exchange fluid is one which has a boiling point substantially outside the boiling range of the feed mixture and has an absorbability substantially the same as that of the absorbed components of the feed mixture. Preferred displacement exchange fluids are the aliphatic primary amines, aliphatic diamines, mono- and di-substituted hydrazines, pyridine, ethylene diamine, aliphatic triamines, tetramines, and nitriles.

The following examples specifically illustrate the practice of the invention.

*Example I*

The nitrogenous feed mixture for this experiment is derived from a hydrogenated shale oil coker distillate. This feed mixture, comprising about 50 percent by volume hydrocarbons and about 50 percent by volume organic nitrogen compounds, is contacted with a lean silica gel adsorbent bed at about 260° F. and atmospheric pressure. The nitrogenous portion of the feed has a composition corresponding to about 76 percent by weight basic organic nitrogen compounds and about 24 percent by weight non-basic organic nitrogen compounds. The liquid phase contacting is continued for about 5 hours, after which the rich silica gel is separated from the raffinate or unadsorbed phase which contains substantially all of the hydrocarbon originally in the feed mixture. The organic nitrogen components of the raffinate analyses about 54 percent by weight basic nitrogen compounds and about 46 percent by weight non-basic nitrogen compounds. The rich adsorbent is then contacted with pyridine as a displacement exchange fluid, whereby there is obtained an extract or adsorbed phase whose organic nitrogen components, when separated from the pyridine, have a composition corresponding to about 83 percent by weight basic nitrogen compounds and about 17 percent by weight non-basic nitrogen compounds.

*Example II*

Another run, conducted in the same manner and with the same feed as Example I, with the exception that the temperature is lowered from about 260° F. to about 80° F., yields a raffinate phase substantially enriched in the non-basic organic nitrogen components of the feed mixture and an extract phase substantially enriched in the basic organic nitrogen components.

*Example III*

A nitrogenous feed derived from a shale oil coker distillate and boiling between about 475° F. and about 525° F. is contacted in the vapor phase with a lean adsorbent bed of silica gel at a temperature of about 600° F. and one atmosphere pressure. One hundred eighty volumes of this feed comprising about 10 percent by volume hydrocarbons and 90 percent by volume organic nitrogen compounds (82 percent by weight basic, 18 percent by weight non-basic) is passed through the silica gel bed with subsequent condensation and collection of the unadsorbed or raffinate effluent. This raffinate contains all of the hydrocarbon components of the feed and a nitrogenous portion having a composition corresponding to about 65 percent by weight basic organic nitrogen compounds and about 35 percent by weight non-basic organic nitrogen compounds.

The rich adsorbent is then contacted with 2,4-diethyl-pyridine at the feed contacting conditions to obtain an extract phase (on a 2,4-diethyl-pyridine-free basis) having a composition corresponding to about 87 percent by weight basic organic nitrogen compounds and about 13 percent by weight non-basic organic nitrogen compounds.

*Example IV*

In this run, the extract of Example III is reprocessed in the same manner as the original feed and a correspondingly higher basic organic nitrogen component concentration is obtained in the resulting extract phase. The final concentration of the basic organic nitrogen rich extract phase is about 96 percent after six successive stages of treatment.

Although the deactivation of the adsorbent is gradual, some deactivation may eventually occur. It is within the scope of this invention to reactivate the silica gel adsorbent by high temperature contacting with a hot reactivating gas such as flue gas, air, etc.

As will be apparent, the process of the invention essentially comprises solids-fluid contacting operations, and any of the various techniques and equipment conventionally applied to such type of operation may be adapted to the practice of the invention without departing from the scope thereof. Thus, while it is often preferred to maintain the adsorbent in the form of a fixed compact bed, the process is nevertheless operable in the form of a moving bed, i.e., as a solids-fluid contacting operation in which a compact bed of silica gel is passed successively through adsorption and desorption zones where it is concurrently or countercurrently contacted with the feed stream and the displacement exchange fluid, respectively. Also, the solids-fluid contacting operation may be carried out employing fluidized techniques whereby the adsorbent is employed in relatively small particle size and is suspended by the flow of the fluid with which it is contacted.

In accordance with conventional terminology found in the petroleum refining art, the basic organic nitrogen compounds are those nitrogen compounds determined by titration of a nitrogenous mixture in acetic acid solution with perchloric acid. The difference, then, between the total organic nitrogen compounds determined by Kjeldahl analysis and the basic organic nitrogen compounds obtained by titration with perchloric acid is, by definition, the non-basic organic nitrogen compounds.

Other modifications and adaptations which would occur to one skilled in this particular art are to be included in the spirit and scope of this invention as defined by the following claims.

We claim:
1. A process for treating a mixture essentially comprising basic and non-basic organic nitrogen compounds, which comprises: (1) contacting said mixture with a lean silica gel adsorbent for a period of time sufficient to effect adsorption of a substantial portion of said basic organic nitrogen compounds; (2) terminating said contacting before all of said non-basic organic nitrogen compounds have been adsorbed whereby there is obtained a rich adsorbent containing adsorbed basic organic nitrogen components of said mixture and a raffinate product which is rich in the non-basic organic nitrogen components of said mixture; and (3) treating said rich adsorbent to recover the adsorbed basic organic nitrogen components therefrom.

2. A process as defined by claim 1 wherein in Step 3 the rich adsorbent is contacted with a displacement exchange fluid to obtain an extract product comprising desorbed basic organic nitrogen compounds and said displacement exchange fluid, and said extract product is treated to separate said displacement exchange fluid therefrom.

3. A process as defined by claim 1 wherein the said adsorbent is periodically contacted with a hot reactivating gas.

4. A process according to claim 2 wherein Step 1 and Step 3 are carried out at substantially the same temperature and pressure.

5. A process according to claim 2 wherein said mixture and said displacement exchange fluid are passed in contact with said adsorbent in opposite flow directions.

6. A process as defined by claim 2 wherein in Step 1 said adsorbent is moved through an adsorption zone in contact with said mixture and in Step 3 said rich adsorbent is moved through an exchange zone in contact with said displacement exchange fluid.

7. A process according to claim 2 wherein said mixture and said displacement exchange fluid are continuously passed in alternation through at least two zones containing said adsorbent.

8. A process for treating a mixture comprising between 100 and about 50 percent of mixed basic and non-basic organic nitrogen compounds and between 0 and about 50 percent hydrocarbons, which process comprises: (1) contacting said mixture with a lean granular silica gel adsorbent, said contacting being effected at a temperature between about 100° F. and about 700° F. and at a pressure between about 0 p.s.i.g. and about 100 p.s.i.g., and continuing said contacting for a period of time sufficient to effect adsorption of a substantial portion of said basic organic nitrogen compounds; (2) terminating said contacting before all of said non-basic organic compounds have been adsorbed whereby there is obtained a rich adsorbent containing adsorbed basic organic nitrogen components of said mixture and a raffinate product which is rich in the non-basic organic nitrogen components of said mixture; and (3) treating said rich adsorbent to desorb the adsorbed basic organic nitrogen compounds therefrom.

9. A process as defined by claim 8 wherein in Step 3 the rich adsorbent is contacted with a displacement exchange fluid to obtain an extract product comprising desorbed basic organic nitrogen compounds and said displacement exchange fluid, and said extract product is treated to separate said displacement exchange fluid therefrom.

10. A process according to claim 9 wherein Step 1 and Step 3 are carried out at substantially the same temperature and pressure.

References Cited in the file of this patent

UNITED STATES PATENTS

| | | |
|---|---|---|
| 2,107,904 | Pool | Feb. 8, 1938 |
| 2,696,305 | Slover | Dec. 7, 1954 |
| 2,696,510 | Weedman | Dec. 7, 1954 |
| 2,728,715 | Rampino | Dec. 27, 1955 |
| 2,744,053 | Kay et al. | May 1, 1956 |
| 2,763,603 | Skinner | Sept. 18, 1956 |